(12) United States Patent
Lucas

(10) Patent No.: US 9,797,268 B2
(45) Date of Patent: Oct. 24, 2017

(54) OIL SCOOP WITH INTEGRATED SENSOR

(71) Applicant: United Technologies Corporation, Hartford, CT (US)

(72) Inventor: James L. Lucas, Hamden, CT (US)

(73) Assignee: United Technologies Corporation, Farmington, CT (US)

( * ) Notice: Subject to any disclaimer, the term of this patent is extended or adjusted under 35 U.S.C. 154(b) by 175 days.

(21) Appl. No.: 14/671,739

(22) Filed: Mar. 27, 2015

(65) Prior Publication Data

US 2016/0281527 A1 Sep. 29, 2016

(51) Int. Cl.
| | |
|---|---|
| *F01D 25/18* | (2006.01) |
| *F16N 7/16* | (2006.01) |
| *F01M 9/12* | (2006.01) |
| *F01M 11/00* | (2006.01) |
| *F16F 1/00* | (2006.01) |
| *F16F 1/24* | (2006.01) |
| *F16N 1/00* | (2006.01) |
| *F16N 3/00* | (2006.01) |
| *F16N 11/04* | (2006.01) |
| *F16N 25/00* | (2006.01) |
| *F01D 17/06* | (2006.01) |
| *F01D 25/16* | (2006.01) |

(52) U.S. Cl.
CPC ............ *F01D 17/06* (2013.01); *F01D 25/16* (2013.01); *F01D 25/18* (2013.01); *Y02T 50/672* (2013.01)

(58) Field of Classification Search
CPC .. F01D 25/18; F16C 2360/23; F16C 33/6659; F16N 2210/02; F16N 7/16

USPC .......................................... 184/6.11, 11.4, 14
See application file for complete search history.

(56) References Cited

U.S. PATENT DOCUMENTS

| | | | | |
|---|---|---|---|---|
| 2,124,914 | A | * | 7/1938 | Fottinger .................. F04D 1/12 415/182.1 |
| 3,074,688 | A | * | 1/1963 | Demuth ................... F01D 25/20 184/6.11 |
| 4,162,443 | A | * | 7/1979 | Brearley ................. G01R 23/10 324/76.15 |
| 4,339,923 | A | * | 7/1982 | Hays ....................... F01K 25/06 415/88 |
| 4,453,784 | A | * | 6/1984 | Kildea .................... F01D 25/18 184/6.11 |
| 4,468,066 | A | * | 8/1984 | Alcorta ................... F01D 25/18 384/462 |
| 4,485,452 | A | * | 11/1984 | Cording .................. G01P 3/489 324/166 |
| 4,576,001 | A | * | 3/1986 | Smith ..................... F01D 25/18 210/167.02 |

(Continued)

OTHER PUBLICATIONS

Szabolcs Serflek, "F-15E.info Technology Pratt & Whitney F100-PW-220/229 Engine", downloaded from <http://www.2007.f-15e.info/technology/engines/pw2/pw2.htm>, 2007.

(Continued)

*Primary Examiner* — Henry Liu
(74) *Attorney, Agent, or Firm* — O'Shea Getz P.C.

(57) ABSTRACT

Aspects of the disclosure are directed to a shaft of an engine of an aircraft, an oil scoop coupled to the shaft, a first portion of a sensor integrated with the oil scoop, and a second portion of the sensor coupled to a structure of the engine. In some embodiments, the first portion of the sensor comprises at least one tooth.

12 Claims, 4 Drawing Sheets

(56) References Cited

U.S. PATENT DOCUMENTS

| | | | | |
|---|---|---|---|---|
| 4,648,485 | A * | 3/1987 | Kovaleski | F01D 25/18 184/13.1 |
| 4,846,780 | A * | 7/1989 | Galloway | B04B 11/02 494/3 |
| 5,111,098 | A * | 5/1992 | Peck | G01P 3/443 310/156.64 |
| 5,440,602 | A * | 8/1995 | Gimmler | G01R 23/10 377/20 |
| 5,489,190 | A * | 2/1996 | Sullivan | F01D 25/18 184/6.11 |
| 5,517,816 | A * | 5/1996 | Faraci | F01D 1/30 60/39.42 |
| 6,019,086 | A * | 2/2000 | Schneider | F02P 7/0775 123/406.18 |
| 6,208,131 | B1 * | 3/2001 | Cebis | F02D 41/009 123/406.58 |
| 6,409,464 | B1 * | 6/2002 | Fisher | F01D 25/16 384/475 |
| 6,412,589 | B1 | 7/2002 | Barlage | |
| 6,682,222 | B2 * | 1/2004 | Fisher | F01D 25/18 384/462 |
| 7,244,096 | B2 * | 7/2007 | Dins | F01D 25/20 415/88 |
| 7,328,122 | B2 * | 2/2008 | Courtney | G01P 3/489 702/142 |
| 7,387,189 | B2 * | 6/2008 | James | F01D 21/14 184/6.11 |
| 7,607,415 | B2 * | 10/2009 | Mathews | F02D 41/009 123/352 |
| 7,835,883 | B2 * | 11/2010 | Takeuchi | G01P 3/481 702/145 |
| 7,866,302 | B2 * | 1/2011 | Spicer | F01L 1/34 123/480 |
| 8,464,835 | B2 * | 6/2013 | Munson | F01D 25/16 184/14 |
| 8,656,762 | B2 * | 2/2014 | Hoetzel | G01D 5/2492 73/114.26 |
| 9,441,541 | B2 * | 9/2016 | Wotzak | F01D 25/18 |
| 2003/0090260 | A1 * | 5/2003 | Stolfus | G01P 3/489 324/166 |
| 2003/0163247 | A1 * | 8/2003 | Kobayashi | F02D 41/009 701/114 |
| 2004/0164730 | A1 * | 8/2004 | Schroeder | G01D 5/145 324/207.22 |
| 2004/0187581 | A1 * | 9/2004 | Kamiya | G01N 29/12 73/593 |
| 2004/0206333 | A1 * | 10/2004 | Makino | F02P 5/1504 123/406.59 |
| 2005/0034924 | A1 * | 2/2005 | James | F01D 21/14 184/6.4 |
| 2006/0048573 | A1 * | 3/2006 | Denny | G01D 11/245 73/488 |
| 2007/0118327 | A1 * | 5/2007 | Courtney | G01P 3/489 702/142 |
| 2008/0128212 | A1 * | 6/2008 | Utzat | F16D 25/123 184/11.4 |
| 2010/0038173 | A1 * | 2/2010 | Munson | F01D 25/16 184/6.11 |
| 2014/0241851 | A1 * | 8/2014 | Demitraszek | F01D 25/18 415/1 |
| 2015/0308283 | A1 * | 10/2015 | Pech | F01D 19/00 415/124.1 |
| 2016/0238628 | A1 * | 8/2016 | Maier | G01P 15/00 |

OTHER PUBLICATIONS

Voith, "Getting the Speed Right. Voith Variable Speed Fluid Couplings", downloaded from <http://voith.com/en/213_e_cr104_en_variable-speed-fluid-couplings.pdf> on Feb. 11, 2015.

Eaton, "New Speed Sensor on Eaton's Char-Lynn HP30 Motor Enhances Speed Sensing Capabilities, Integrated to Shield from Harsh Environments", downloaded from <http://www.eaton.com/Eaton/OurCompany/NewsEvents/NewsReleases/PCT_1207340>, Jan. 27, 2015.

SKF Group, "Solutions for Traction Motors", downloaded from <http://www.skf.com/binary/49-57716/6815EN.pdf>, 2008.

Honeywell, "High Temperature Industrial VRS Magnetic Speed Sensors", available from <www.honeywell.com/sensing>, Mar. 2007.

Wikipedia.org, "Variable Reluctance Sensor", available from <http://en.wikipedia.org/wiki/Variable_reluctance_sensor>, downloaded on Mar. 11, 2015.

* cited by examiner

OIL SCOOP WITH INTEGRATED SENSOR

STATEMENT REGARDING FEDERALLY SPONSORED RESEARCH OR DEVELOPMENT

This invention was made with government support under contract number W911W6-08-2-0001 awarded by the United States Army. The government has certain rights in the invention.

BACKGROUND

In connection with an aircraft engine, an oil circuit supplies oil to a number of bearings that are positioned at longitudinally spaced apart locations along one or more engine shafts. Bearing compartments enclose the bearing assemblies and maintain a volume of oil with an oil-air interface. Within the bearing compartments, oil is supplied under pressure and is sprayed at selected areas or diffused through bearing assemblies. The oil flow cools the bearing assemblies which develop heat under friction, lubricates the bearing assemblies, flushes out any foreign particles that develop and splashes within the bearing compartment to cool and lubricate internal surfaces before being withdrawn from the bearing compartment by, e.g., the vacuum of a scavenge pump.

Various oil circulation mechanisms are provided in flow communication with each bearing compartment to supply a continuous flow of oil to the bearing compartment and scavenge spent oil from an outlet of the bearing compartment. Oftentimes, oil is supplied to bearing compartment components, e.g., seals and bearings through a shaft mounted oil scoop.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a system comprising: a shaft of an engine of an aircraft, an oil scoop coupled to the shaft, a first portion of a sensor integrated with the oil scoop, and a second portion of the sensor coupled to a structure of the engine. In some embodiments, the first portion of the sensor comprises at least one tooth. In some embodiments, the first portion of the sensor comprises a plurality of teeth. In some embodiments, the plurality of teeth comprises a first tooth that is offset with respect to a spacing that is used between the remainder of the teeth. In some embodiments, the second portion of the sensor comprises at least one measurement device. In some embodiments, the second portion of the sensor comprises a plurality of measurement devices. In some embodiments, the sensor is configured to operate on the basis of electromagnetism. In some embodiments, the sensor is configured to operate on the basis of at least one of the Hall effect or variable reluctance. In some embodiments, the sensor is configured to operate on the basis of a generation of current or an interruption of light. In some embodiments, the sensor is configured to operate on the basis of a relative motion between the first portion and the second portion. In some embodiments, the sensor is configured to calculate at least one of a rotational speed, an angular velocity, or a frequency associated with at least one of the shaft or the oil scoop. In some embodiments, the system further comprises an oil jet configured to provide oil to the oil scoop.

Aspects of the disclosure are directed to a method comprising: manufacturing an oil scoop to include a first portion of a sensor, coupling the oil scoop to a shaft of an engine, and coupling a second portion of the sensor to a structure of the engine. In some embodiments, the method further comprises coupling an oil jet to the structure of the engine, wherein the oil jet is configured as a source of oil with respect to the oil scoop. In some embodiments, the first portion of the sensor comprises a plurality of teeth arranged around a perimeter of the oil scoop. In some embodiments, the plurality of teeth comprises a first tooth that is offset with respect to a spacing that is used between the remainder of the teeth. In some embodiments, the second portion of the sensor comprises a plurality of measurement devices. In some embodiments, the sensor is configured to calculate at least one of a rotational speed, an angular velocity, or a frequency associated with at least one of the shaft or the oil scoop. In some embodiments, the method further comprises coupling an oil jet to the structure of the engine that is configured to provide oil to the oil scoop.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
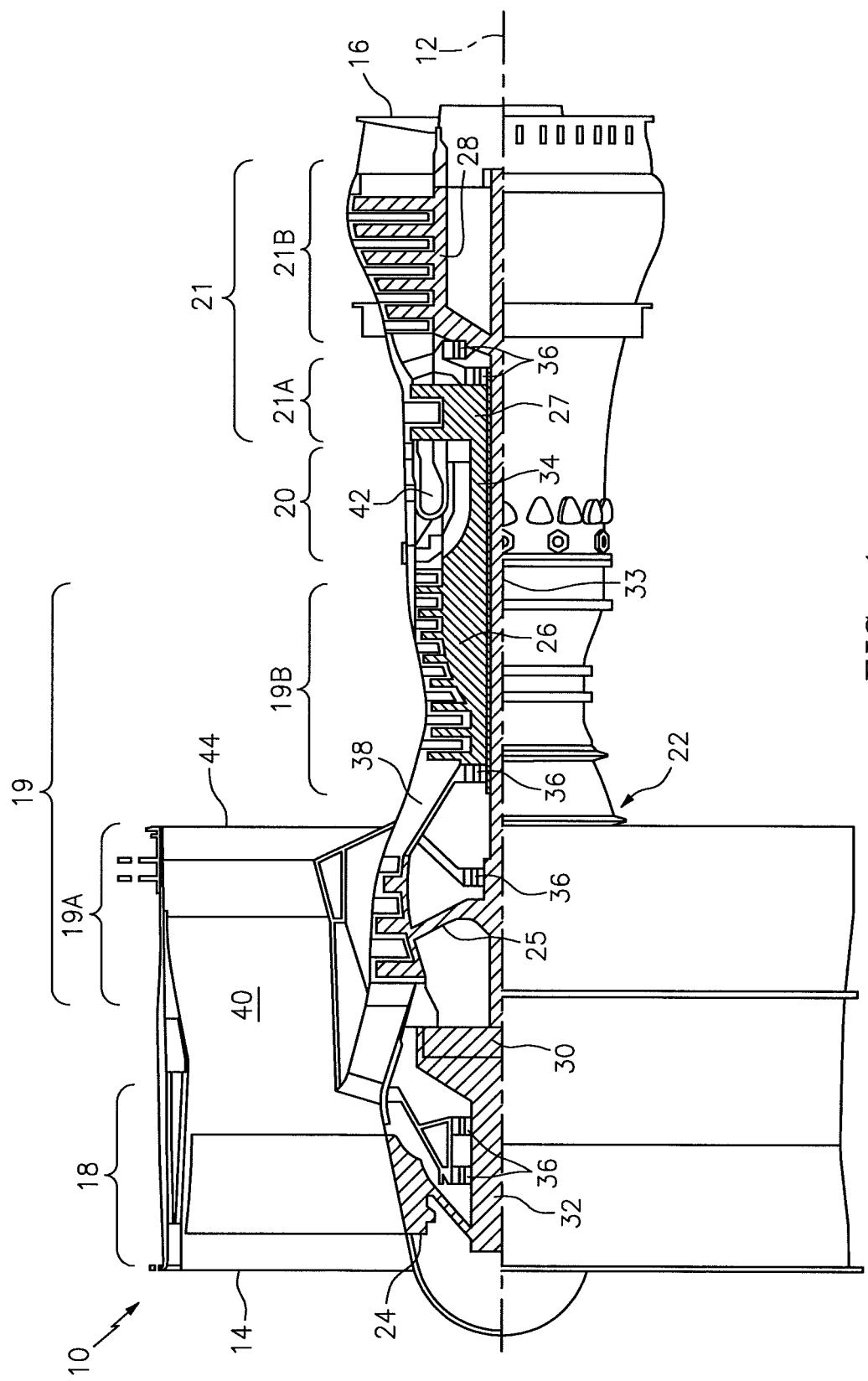
FIG. 1 is a side cutaway illustration of a geared turbine engine.

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

In accordance with various aspects of the disclosure, apparatuses, systems and methods are described for providing an oil scoop (e.g., a radial oil scoop). In some embodiments, the oil scoop may include, or be integrated with, a sensor (or a portion of a sensor). The sensor may be configured to measure or determine a rotational speed, such as a rotational speed associated with a shaft of an aircraft engine. The rotational speed may be specified in accordance with one or more units of measure, such as for example revolutions per minute. Other parameters, such as for example angular velocity or frequency may be determined/calculated.

Aspects of the disclosure may be applied in connection with an engine of an aircraft, such as for example a multi-spool turboshaft engine associated with a helicopter. Furthermore, aspects of the disclosure may be applied in connection with an oil system of an engine. In some embodiments, a sensor (or a portion of a sensor) may be integrated with an oil scoop.

Aspects of the disclosure may be applied in connection with a gas turbine engine. FIG. 1 is a side cutaway illustration of a geared turbine engine 10. This turbine engine 10 extends along an axial centerline 12 between an upstream airflow inlet 14 and a downstream airflow exhaust 16. The turbine engine 10 includes a fan section 18, a compressor section 19, a combustor section 20 and a turbine section 21. The compressor section 19 includes a low pressure compressor (LPC) section 19A and a high pressure compressor (HPC) section 19B. The turbine section 21 includes a high pressure turbine (RPT) section 21A and a low pressure turbine (LPT) section 21B.

The engine sections 18-21 are arranged sequentially along the centerline 12 within an engine housing 22. Each of the engine sections 18-19B, 21A and 21B includes a respective rotor 24-28. Each of these rotors 24-28 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 24 is connected to a gear train 30, for example, through a fan shaft 32. The gear train 30 and the LPC rotor 25 are connected to and driven by the LPT rotor 28 through a low speed shaft 33. The HPC rotor 26 is connected to and driven by the HPT rotor 27 through a high speed shaft 34. The shafts 32-34 are rotatably supported by a plurality of bearings 36; e.g., rolling element and/or thrust bearings. Each of these bearings 36 is connected to the engine housing 22 by at least one stationary structure such as, for example, an annular support strut.

During operation, air enters the turbine engine 10 through the airflow inlet 14, and is directed through the fan section 18 and into a core gas path 38 and a bypass gas path 40. The air within the core gas path 38 may be referred to as "core air". The air within the bypass gas path 40 may be referred to as "bypass air". The core air is directed through the engine sections 19-21, and exits the turbine engine 10 through the airflow exhaust 16 to provide forward engine thrust. Within the combustor section 20, fuel is injected into a combustion chamber 42 and mixed with compressed core air. This fuel-core air mixture is ignited to power the turbine engine 10. The bypass air is directed through the bypass gas path 40 and out of the turbine engine 10 through a bypass nozzle 44 to provide additional forward engine thrust. This additional forward engine thrust may account for a majority (e.g., more than 70 percent) of total engine thrust. Alternatively, at least some of the bypass air may be directed out of the turbine engine 10 through a thrust reverser to provide reverse engine thrust.

FIG. 1 represents one possible configuration for an engine 10. Aspects of the disclosure may be applied in connection with other environments, including additional configurations for an engine of an aircraft.

Figure 1A:
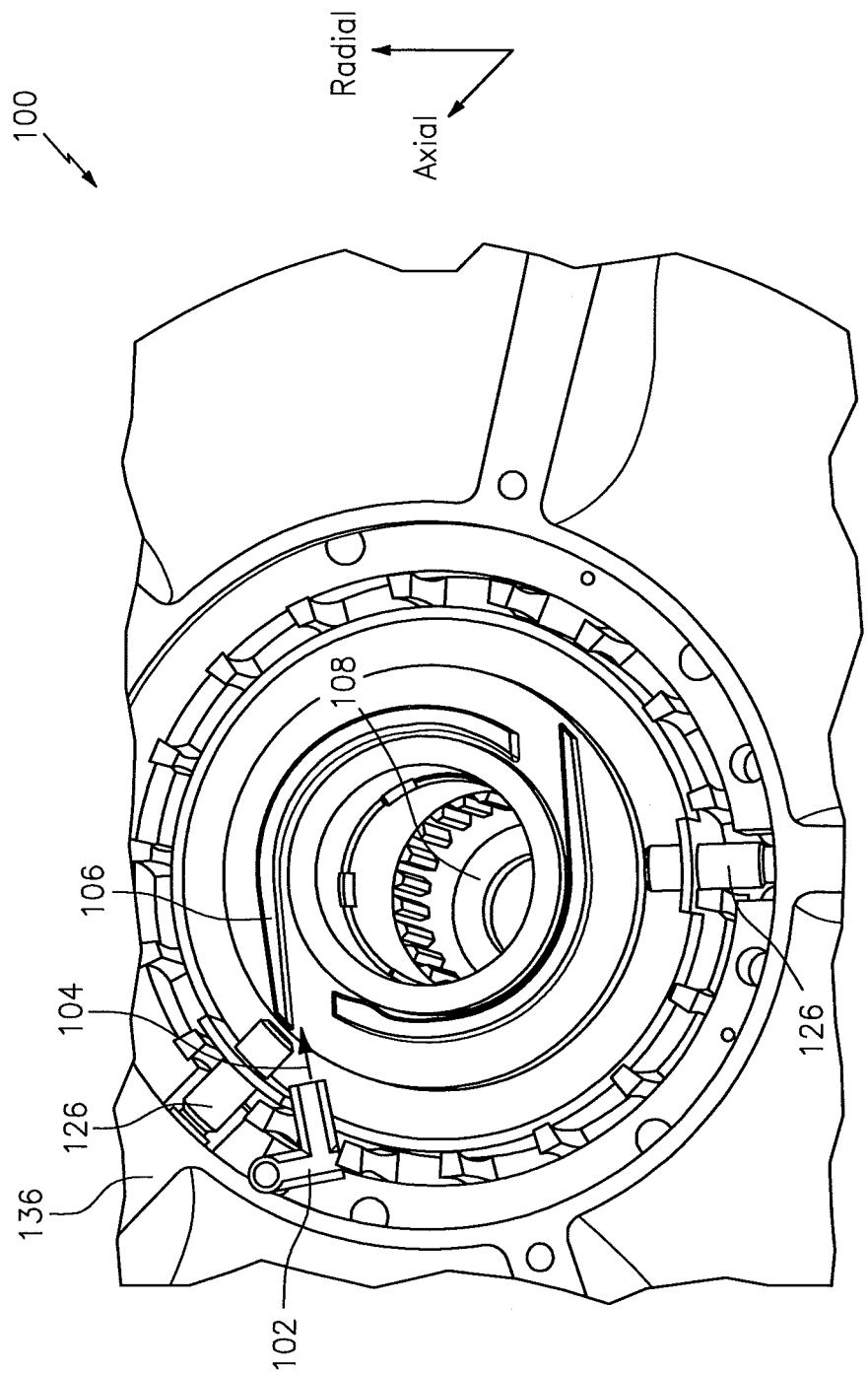
FIGS. 1A-1B illustrate an exemplary system for integrating a portion of a sensor with an oil scoop.
Figure 1B:
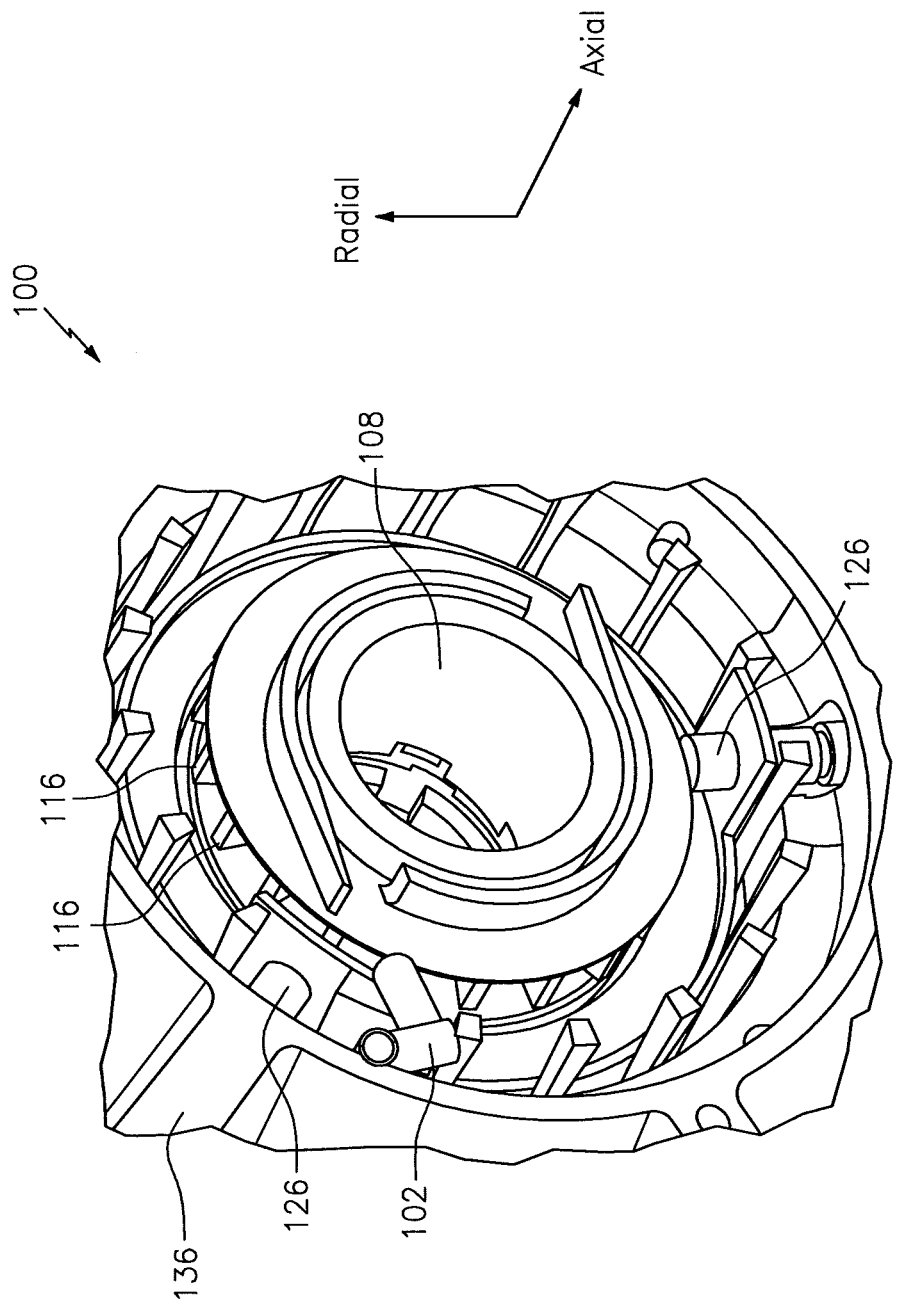

Referring to FIGS. 1A-1B, a portion of an oil system 100 of an engine in accordance with aspects of this disclosure is shown. The system 100 may include one or more oil jets 102. An oil jet 102 may be configured to supply (a jet of) oil (as reflected/represented via the arrow 104) to an oil scoop 106. The oil scoop 106 may be coupled to a shaft 108 of the engine. With respect to the views shown in FIGS. 1A-1B, the shaft 108 may be configured to rotate in the counter-clockwise direction. An axis of the engine may defined along the span/length of the shaft 108; in FIG. 1A the engine axis may be substantially oriented into-and-out-of the page as shown. The oil scoop 106 may be referred to as a radial oil scoop in the sense that it may entrap and direct the oil 104 that it receives in a radial direction (e.g., inboard or toward the shaft 108).

As shown, one or more teeth 116 may be included with, or integrated into, the oil scoop 106. The oil scoop 106 may be configured to rotate with the shaft 108, such that the teeth 116 may rotate with the same speed/velocity as the shaft 108.

The system 100 may include one or more measurement devices 126. Multiple measurement devices 126 may be used to provide redundancy in the system 100 and may be used for purposes of reliability and data integrity. For example, a comparison may be performed between a first data point/set generated by a first measurement device 126 and a second data point/set generated by a second measurement device 126—if the comparison indicates a difference that is greater than a threshold a fault/error may be declared. The embodiment of FIGS. 1A-1B is shown as including two measurement devices 126; any number of measurement devices 126 may be used in a given embodiment.

Generally, the teeth 116 may be substantially equally spaced along the circumference/perimeter of the oil scoop 106. However, one of the teeth 116 might not adhere to such equal spacing. Instead, that one tooth 116 may be offset by a given amount (e.g., an amount that is sufficiently large so as to enable the measurement devices 126 to distinguish that tooth 16 from the remainder of the teeth 116). This offset may be used by the measurement devices 126 to calculate a speed or frequency of rotation of that one tooth, which may adhere to a 1/rev indexing.

The measurement devices 126 and teeth 116 may be configured to operate on the basis of one or more principles. For example, the principle of operation may be grounded in electromagnetism (e.g., the Hall effect). In some embodiments, a generation or an interruption of current or light (e.g., a light beam) may serve as the principle of operation. Other techniques may be used.

Aspects of the disclosure may provide for a high temperature variable reluctance speed sensor. The sensor may incorporate a ferrous material wheel with ferrous material teeth. Aspects of the disclosure may apply to a toothed wheel that uses teeth and of a material that would be suitable for an oil scoop. In some embodiments, a composite part (or other non-ferrous) could be used with a light or laser system. The composite may be suitable for high temperature use and may be oil resistant. High temperatures may entail compatibility with an oil compartment environment of 350 degrees Fahrenheit (176.7 degrees Celsius) to 400 degrees Fahrenheit (204.5 degrees Celsius). High temperatures may cause oil to break down and "coke". Some embodiments may utilize capacitance as a basis for providing a sensor. Ceramic materials may be used in some embodiments.

While in FIGS. 1A-1B the teeth 116 are shown as having been integrated onto the oil scoop 106 and the measurement devices 126 are shown as having mounted in a fixed/stationary position with respect to a structure 136 of the engine, in some embodiments the teeth 116 may be fixed/stationary and the measurement devices 126 may be configured to rotate. In other words, a sensor that is formed by a combination of the teeth 116 and a measurement device 126 may be operative on the basis of the relative motion between the teeth 116 and the measurement device 126. The teeth 116 and the measurement device 126 may each form a portion of the sensor.

Figure 2:
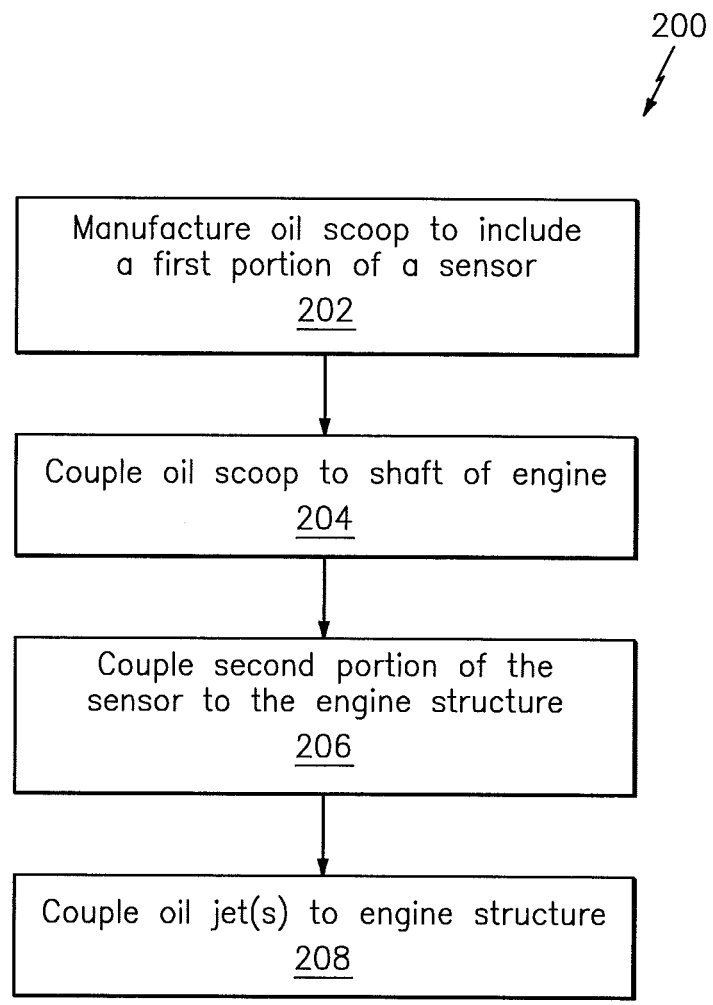
FIG. 2 illustrates an exemplary method for forming an oil system.

Referring now to FIG. 2, a flow chart of an exemplary method 200 is shown. The method 200 may be executed by, or in conjunction with, one or more systems, components, or devices, such as those described herein. For example, the method 200 may be executed in order to form a portion of an oil system, such as the oil system 100 described above.

In block 202, an oil scoop may be manufactured/fabricated. The oil scoop may include a first portion of a sensor. For example, one or more teeth may be included as part of the oil scoop.

In block 204, the oil scoop may be coupled to a shaft of an engine.

In block 206, a second portion of the sensor may be coupled to a structure of the engine. For example, one or more measurement devices may be coupled to the structure of the engine.

In block 208, an oil jet may be coupled to the structure of the engine. The oil jet may be configured as a source of oil with respect to the oil scoop.

The blocks described above in connection with the method 200 are illustrative. In some embodiments, the blocks may execute in an order or sequence that is different from what is shown and described above. In some embodiments, one or more of the blocks (or a portion thereof) may be optional. In some embodiments, additional blocks not shown may be included.

Technical effects and benefits of the disclosure include an integration of one or more sensors, or one or more portions of one or more sensors, with an oil scoop. Such an integration may be used to save space (e.g., space oriented along an axis of an engine). Furthermore, the integration may enable savings in terms of weight and cost.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure.

What is claimed is:

1. A lubrication system for a gas turbine engine, comprising:
   a shaft;
   an oil scoop coupled to the shaft;
   a first portion of a sensor integrated with the oil scoop; and
   a second portion of the sensor coupled to a structure of the engine.

2. The lubrication system of claim 1, wherein the first portion of the sensor comprises at least one tooth.

3. The lubrication system of claim 1, wherein the first portion of the sensor comprises a plurality of teeth.

4. The lubrication system of claim 3, wherein the plurality of teeth comprises a first tooth that is offset with respect to a spacing that is used between the remainder of the teeth.

5. The lubrication system of claim 1, wherein the second portion of the sensor comprises at least one measurement device.

6. The lubrication system of claim 1, wherein the second portion of the sensor comprises a plurality of measurement devices.

7. The lubrication system of claim 1, wherein the sensor is configured to operate on the basis of electromagnetism.

8. The lubrication system of claim 1, wherein the sensor is configured to operate on the basis of at least one of the Hall effect or variable reluctance.

9. The lubrication system of claim 1, wherein the sensor is configured to operate on the basis of a generation of current or an interruption of light.

10. The lubrication system of claim 1, wherein the sensor is configured to operate on the basis of a relative motion between the first portion and the second portion.

11. The lubrication system of claim 1, wherein the sensor is configured to calculate at least one of a rotational speed, an angular velocity, or a frequency associated with at least one of the shaft or the oil scoop.

12. The lubrication system of claim 1, further comprising:
    an oil jet configured to provide oil to the oil scoop.

* * * * *